METHOD OF FORMING AND PULLING CONTACT TERMINALS
INTO AN ELECTRICAL RECEPTACLE

Original Filed June 29, 1959 11 Sheets-Sheet 1

INVENTOR
ALFRED H. JOHNSON
BY Donald F. Voss
ATTORNEY

June 29, 1965 A. H. JOHNSON 3,191,271

METHOD OF FORMING AND PULLING CONTACT TERMINALS INTO AN ELECTRICAL RECEPTACLE

Original Filed June 29, 1959 11 Sheets-Sheet 8

United States Patent Office 3,191,271
Patented June 29, 1965

3,191,271

METHOD OF FORMING AND PULLING CONTACT TERMINALS INTO AN ELECTRICAL RECEPTACLE

Alfred H. Johnson, Endicott, N.Y., assignor to International Business Machines Corporation, New York, N.Y., a corporation of New York Original application June 29, 1959, Ser. No. 823,565, now Patent No. 3,077,023, dated Feb. 12, 1963. Divided and this application Feb. 26, 1962, Ser. No. 175,467
4 Claims. (Cl. 29—155.55)

This invention relates to a method for forming and inserting contact elements into a receptacle and, more particularly, to a method for forming and inserting contact elements into a receptacle with the contact elements still connected to the material from which they are formed. After the contact elements are inserted and secured relative to the receptacle, they are severed or disconnected from the stock material.

This application is a division of the copending application of Alfred H. Johnson, Serial No. 823,565, filed June 29, 1959, now U.S. Patent 3,077,023, dated February 12, 1963.

Heretofore, it had been the practice to form the contact elements from stock material and separate the same from the stock material prior to their insertion into a receptacle. This practice, while generally satisfactory, has certain disadvantages which are overcome by the present invention.

When the contact elements are formed and separated from the stock from which they are formed prior to insertion into a receptacle, handling and storage problems for the contact elements are created. Once the contact elements are formed, it is essential that they do not become twisted or distorted prior to insertion into the receptacle. Further, the separate contact elements require storage until the mechanism for inserting them into the receptacle is ready to accept them. Hence, mechanism is required to transport the contact elements from storage to the inserting mechanism. The contact elements must not become damaged either in storage or in transit.

The problem of the contact elements becoming damaged prior to insertion into the receptacle is obviated in the present invention because the contact elements, after being formed, are immediately inserted into the receptacle while still being connected to the stock material. Since the contact elements are first formed and then inserted while connected to the stock material, the handling and transporting problems attendant with separate contact elements are eliminated.

Normally, the insertion of separate contact elements into a receptacle is not a very difficult task. However, it becomes somewhat of a problem to insert separate contact elements into a receptacle when the contact elements must be pulled into position. While it would be possible to provide each separate contact element with sufficient surplus stock to act as a leader for positioning and then trimming off this surplus stock, this type of operation would be costly. In the instant invention, the stock material acts as a leader because it is inserted into the receptacle prior to forming the contact elements. After the contact elements are formed, the stock material which is still connected to the contact elements serves as a leader for enabling the contact elements to be pulled into position.

This invention also provides for forming and inserting contact elements into a receptacle having adjacent rows of receiving passageways offset from each other. The contact elements to be inserted in one row of passageways are formed and inserted at one work station while the contact elements to be inserted in the offset adjacent row of passageways are formed and inserted at another work station.

Accordingly, it is a principal object of this invention to provide an improved method for forming and inserting contact elements into a receptacle.

A more specific object of this invention is to provide an improved method for forming and inserting contact elements into a receptacle which includes the feeding of the stock material into the receptacle prior to the forming of the contact elements.

Another more specific object of the invention is to provide a method for forming and inserting contact elements into a receptacle which includes inserting the formed contact elements into the receptacle before the contact elements are severed from the remaining stock material from which they are formed.

Still another object of the invention is to provide a method for forming and inserting contact elements into a receptacle having adjacent rows of receiving passageways offset from each other which forms and inserts contact elements into one row of receiving passageways at one work station and forms and inserts contact elements into an adjacent row of offset receiving passages at another work station.

An additional object of the invention is to provide a method for forming and inserting contact elements into receptacles having adjacent rows of receiving passageways offset from each other which forms and inserts contact elements into alternate rows of receiving passageways of one receptacle at one work station while forming and inserting contact elements into alternate rows of receiving passages of another receptacle at another work station.

Another desirable feature of the invention is that, after the contact elements are inserted and seated within the receptacle, they may be severed from the stock material at different positions to leave portions of predetermined lengths extending from the base of the receptacle. The portions of the contact elements extending from the receptacle are for facilitating cable connections such as by wrapping several turns of wire around the extending portions of the contact elements. Of course, if cable connections are not to be made, the contact element may be severed from the stock material at the base of the receptacle.

The foregoing and other objects, features and advantages of the invention will be apparent from the following more particular description of preferred embodiments of the invention, as illustrated in the accompanying drawings.

Figure 14C:
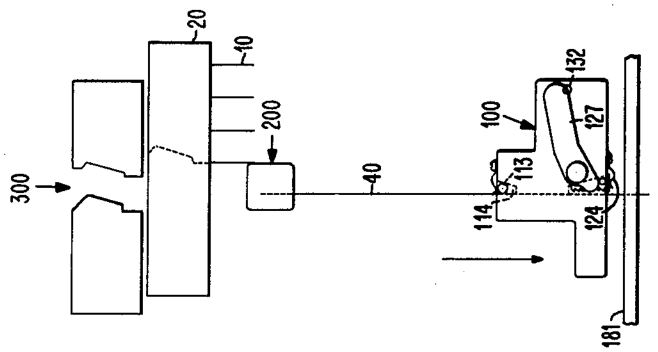
Figure 14B:
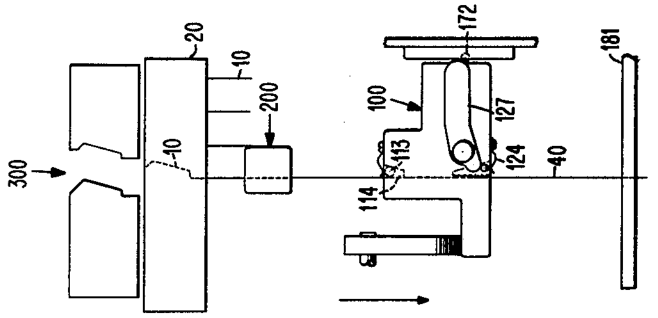
Figure 14A:
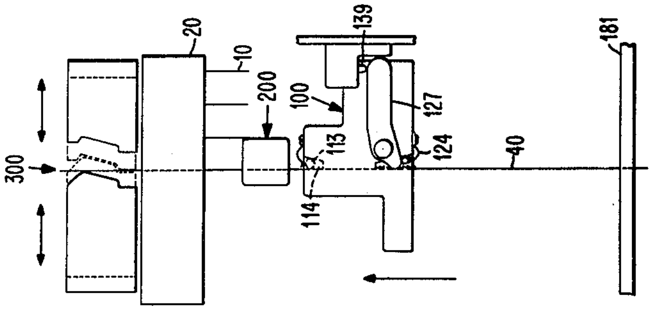
Figure 15:
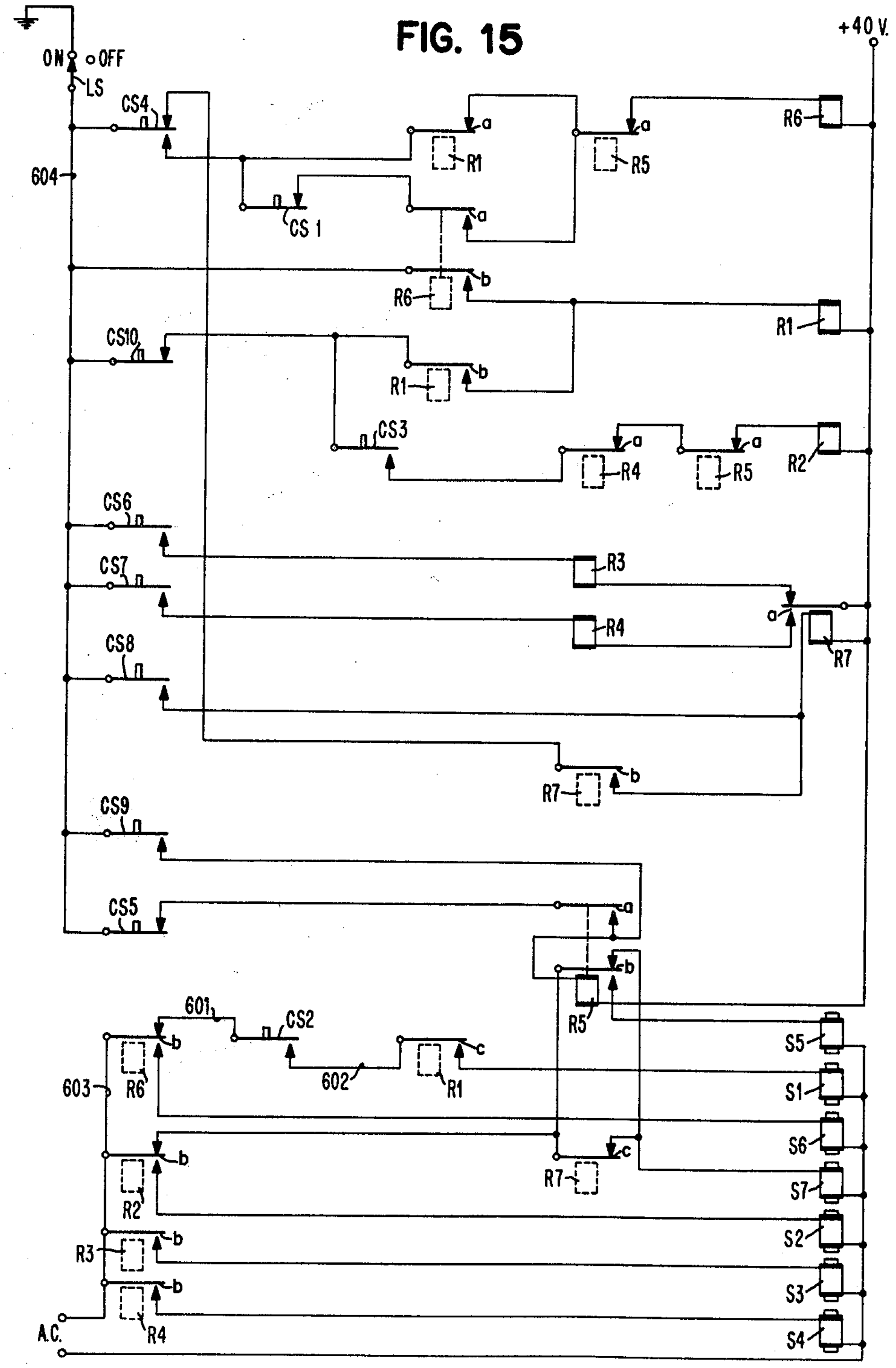
Figure 16:
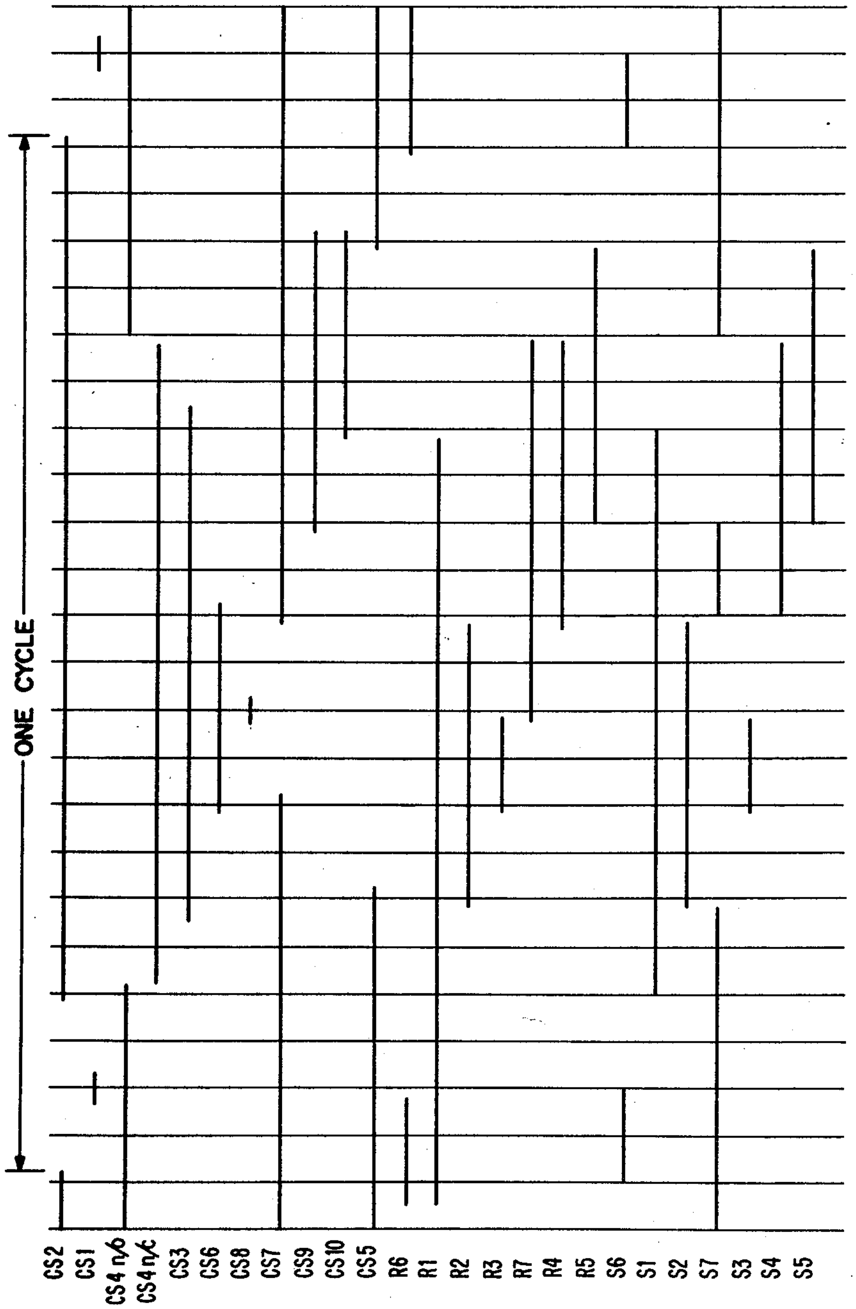

FIGS. 14*a*, 14*b* and 14*c* are schematic views showing the relative positions of the stock feeding and pulling mechanism after the stock is fed between the forming dies, after the seating of the formed contact elements, and after the severing of the contact elements from the stock material and the advancement of the receptacle;

FIG. 15 is a schematic view of the control circuitry for controlling the operation of the contact element forming and inserting apparatus at each of the work stations; and, FIG. 16 is a timing diagram showing one cycle of operation of the contact element forming and inserting apparatus.

*General*

Figure 2:
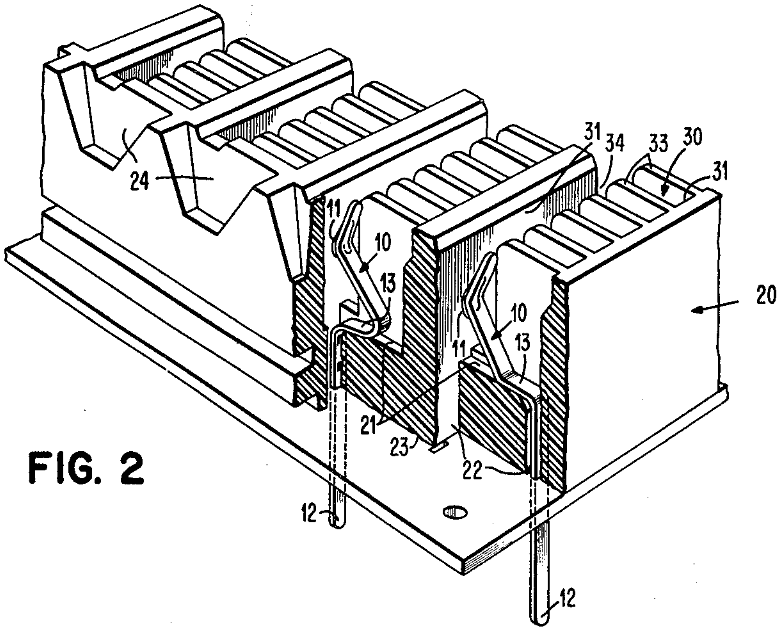
FIG. 2 is a perspective view of one of the receptacles having the formed contact elements inserted therein and extending through apertures of a back panel attached to the base of the receptacle, sections of the receptacle are broken away to show the contact elements and their relative positions within the receptacle.

This invention involves a method and apparatus for forming and inserting stressed contact elements 10, FIG. 2, into a receptacle 20 having a plurality of floored cavities 30 with opposite side and end walls 31 and 32, respectively, each cavity 30 being provided with a plurality of transversely spaced separators 33 extending from one of the side walls 31 toward the opposite side wall 31 and terminating short thereof so as to form with the opposite side wall a residing groove 34 for pluggable elements, not shown, carrying electronic components interconnected by conductors leading to terminals which are disposed to make electrical contact with the contact elements 10 of the receptacle 20. The floor 21 of each cavity 30 in the receptacle communicates with two spaced apart rows of alternately disposed passageways 22 extending from the floor 21 of the cavity 30 to and through the base 23 of the receptacle 20.

The contact elements 10 associated with each cavity 30 of the receptacle 20 are two different configurations so that a contact portion 11 of each contact element 10 abuts the aforesaid opposite side wall 31 and a tail portion 12 extends through one of the passageways 22 to project from the base 23 of the receptacle 20. Since the passageways 22 associated with each cavity 30 are in two spaced apart offset rows, an intermediate portion 13 of the contact elements 10 is shaped so as to lead the tail portion 12 into the passageways 22. Hence, the intermediate portions 13 of adjacent contact elements 10 are differently shaped so as to lead the tail portion 12 of one of the contact elements 10 into one of the passageways 22 of one of the rows and to lead the tail portion 12 of the adjacent contact element 10 into one of the passageways 22 of the other or adjacent row.

Figure 3:
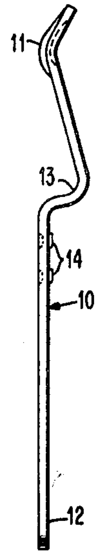
FIG. 3 is a detail view of a contact element illustrative of contact elements having that particular configuration.
Figure 4:
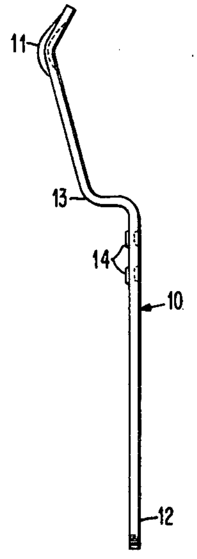
FIG. 4 is a detail view of a contact element illustrative of contact elements of the other configuration or those positioned in the receptacle adjacent to the contact elements having the configuration as shown in FIG. 3.

The tail portion 12 of each contact element 10 is provided with dimple-formed protuberances 14, FIGS. 3 and 4, located near the intermediate portion 13 of the contact elements 10 which, upon insertion of the formed contact elements 10 into the receptacle 20, FIG. 2, bite into the portion between the floor 21 and base 23 of the receptacle and surround the passageways 22 so as to firmly anchor the contact elements 10 relative to the receptacle 20. Further, by anchoring the contact elements 10 in this manner, any disturbance of the tail portion 12 of the contact elements 10 will not be transmitted to the contact portion 11. Hence, the electrical connection established between the contact portion 11 of the contact elements 10 and the terminals of the pluggable element, not shown, will not be disturbed. Whereas, if this electrical connection were disturbed, the contact elements 10 would more than likely re-establish the electrical connection through adjacent surface oxides or foreign matter to result in a faulty connection.

The receptacle with the formed and inserted contact elements is described in greater detail in the copending application of A. H. Johnson, Serial No. 752,038, filed July 30, 1958, now U.S. Patent 3,008,113, dated November 7, 1961.

The above generally describes the structure of the receptacle 20 and contact elements 10 and the disposition of the contact elements 10 within the receptacle 20. The following will describe in general the method and apparatus for forming and inserting the contact elements into the receptacle. The contact elements 10 are formed from strip stock 40 which is fed by a stock feeding and pulling mechanism 100, FIG. 1, through a stock cutoff mechanism 200, and through the passageways 22 and cavities 30 of the receptacles 20 to enter between contact element forming dies 300.

It would be possible to form the contact elements 10 for the adjacent row of passageways 22 at the same work station. However, this would require a lateral shift of the receptacle 20 or of the stock feeding and pulling mechanism 100 and the stock cutoff mechanism 200 because of the offset arrangement of the adjacent rows of passageways 22 in the receptacles 20. In this example, FIG. 1, there are two work stations. One station 50 is provided for forming and seating the contact elements 10 of one configuration into one row of passageways 22, while a second station 60 spaced from the first station 50 is provided for forming and seating the contact elements 10 of the other configuration into the adjacent row of passageways 22. Hence, it is seen that every other row of passageways 22 receives the tail portion 12 of the contact elements 10 formed at one station. The adjacent rows of passageways 22 are spaced ¼ inch apart; therefore, the receptacles 20 are fed in increments of ½ inch at each station so as to bring into position another like row of passageways 22. Except for the configuration of the forming dies 300, the mechanism at one work station is substantially identical to that at the other work station. Accordingly, the apparatus located at one of the work stations, the work station 50, will be described in detail and this will suffice as a description for the apparatus located at the other work station 60.

Figure 1:
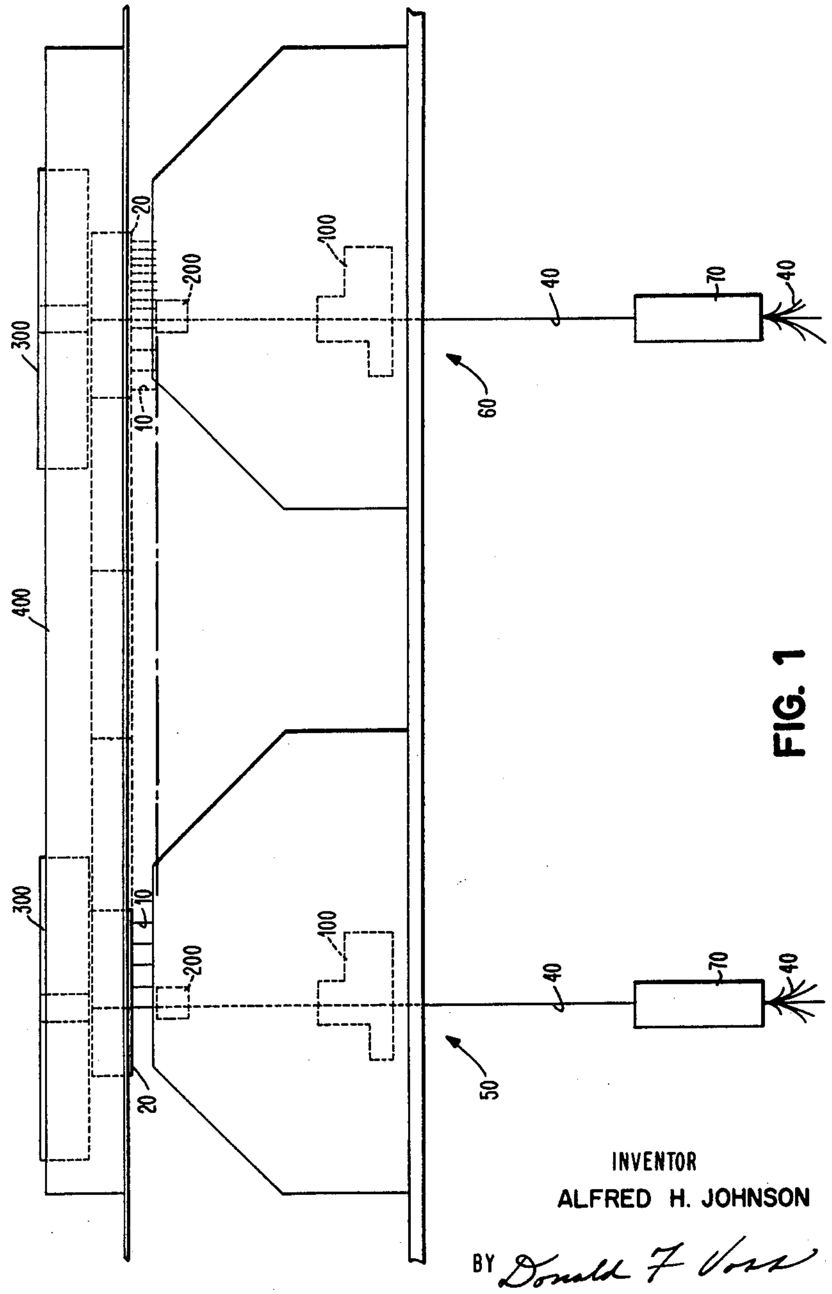
FIG. 1 is a schematic view showing the two work stations whereat apparatus is located for forming and inserting contact elements into receptacles and for advancing the receptacles relative to the work stations.
Figures 5, 6:
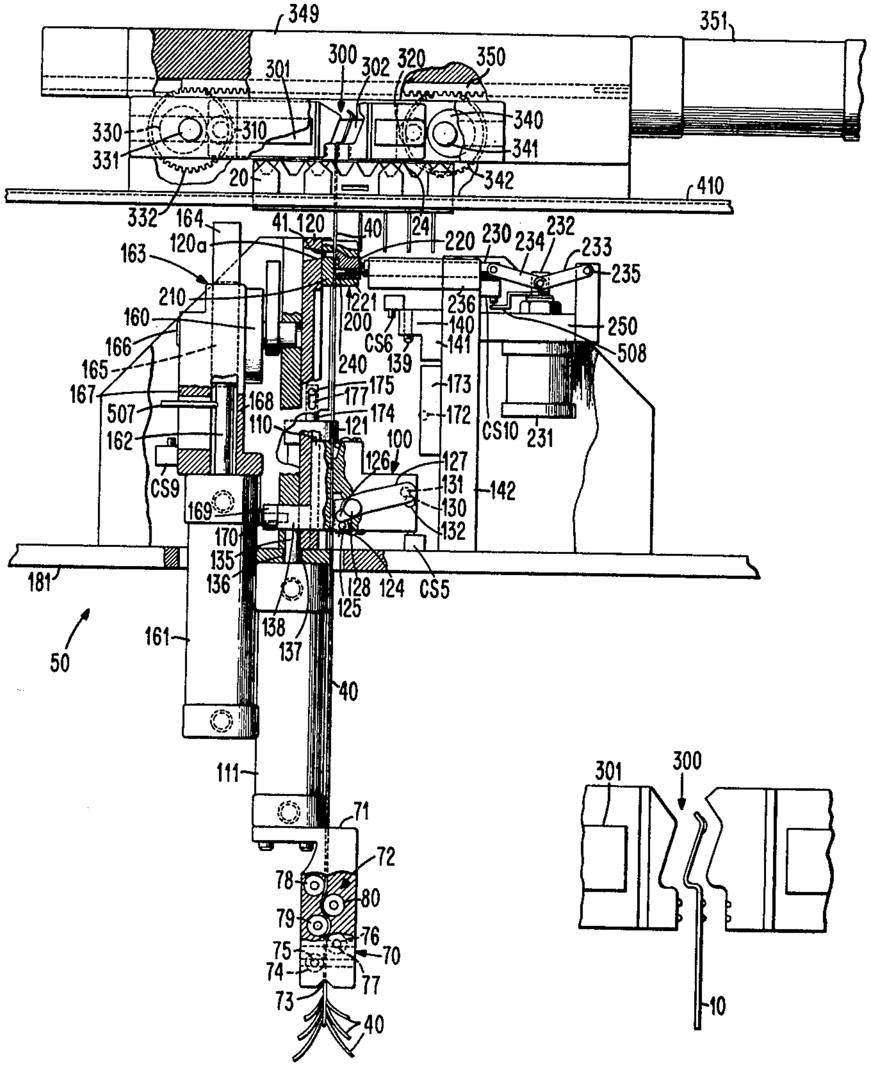
FIG. 5 is a front elevational view of the apparatus for forming and inserting the contact elements of one configuration into the receptacles positioned relative thereto at the first work station, the receptacle advancing mechanism is not shown.
FIG. 6 is a detail view of the contact element forming dies for forming the contact elements of the other configuration which are inserted in the receptacles positioned at the second work station, the other apparatus located at the second work station being substantially identical to that positioned at the first work station.

Referring to FIGS. 1 and 5, the contact elements 10, represented by the contact element 10 shown in FIG. 4, are formed at station 50 from metallic strip stock 40, preferably tin-plated Phosphor bronze, which is contained upon two rows of four parallelly spaced supply reels, not shown. The stock material 40 from the eight supply reels passes in parallel along a common feed path which takes the stock through a straightening mechanism 70 and through the stock feeding and pulling mechanism 100 to the stock cutoff mechanism 200. The stock feeding and pulling mechanism 100, when operated, feeds the stock 40 from the stock cutoff mechanism 200 through one row of aligned passageways 22 of a receptacle 20, into the cavity 30 and therebeyond to extend between the pair of cooperating contact element forming dies 300 a sufficient amount to permit the forming of the contact elements 10 having a configuration whereby the intermediate portion 13 will lead the tail portion 12 into the passageways 22 through which the stock 40 had entered.

The stock feeding and pulling mechanism 100 has two primary functions. It serves to feed the stock 40 upward through the stock cutoff mechanism 200, the receptacle 20, and between the forming dies 300. It also serves to pull the stock 40 downward after the contact elements 10 are formed so as to seat the contact elements 10 into the receptacle 20. The stock feeding and pulling mechanism 100 is carried by a slide member 110, FIGS. 5, 11 and 13, which reciprocates within another slide member 120. The slide members 110 and 120 are connected to be independently operated by pneumatic cylinder drive elements 111 and 121, respectively, of conventional form, FIG. 5. While the cylinder 111 is adequate to operate the slide 110 carrying the stock feeding and pulling mechanism 100 when feeding the stock 40 into position for forming, a cam 160 driven by a pneumatic cylinder 161 through gearing 163 additionally acts upon the slide 110 to force the same together with the stock feeding and pulling mechanism 100 downward during the operation for seating the formed contact elements 10 in the receptacle 20. This additional force is desirable because of the high force requirements for seating the formed contact elements 10 in the receptacle 20 by pulling on the stock material 40 to draw the dimple-formed protuberances 14 into the passageways 22.

Figure 11:
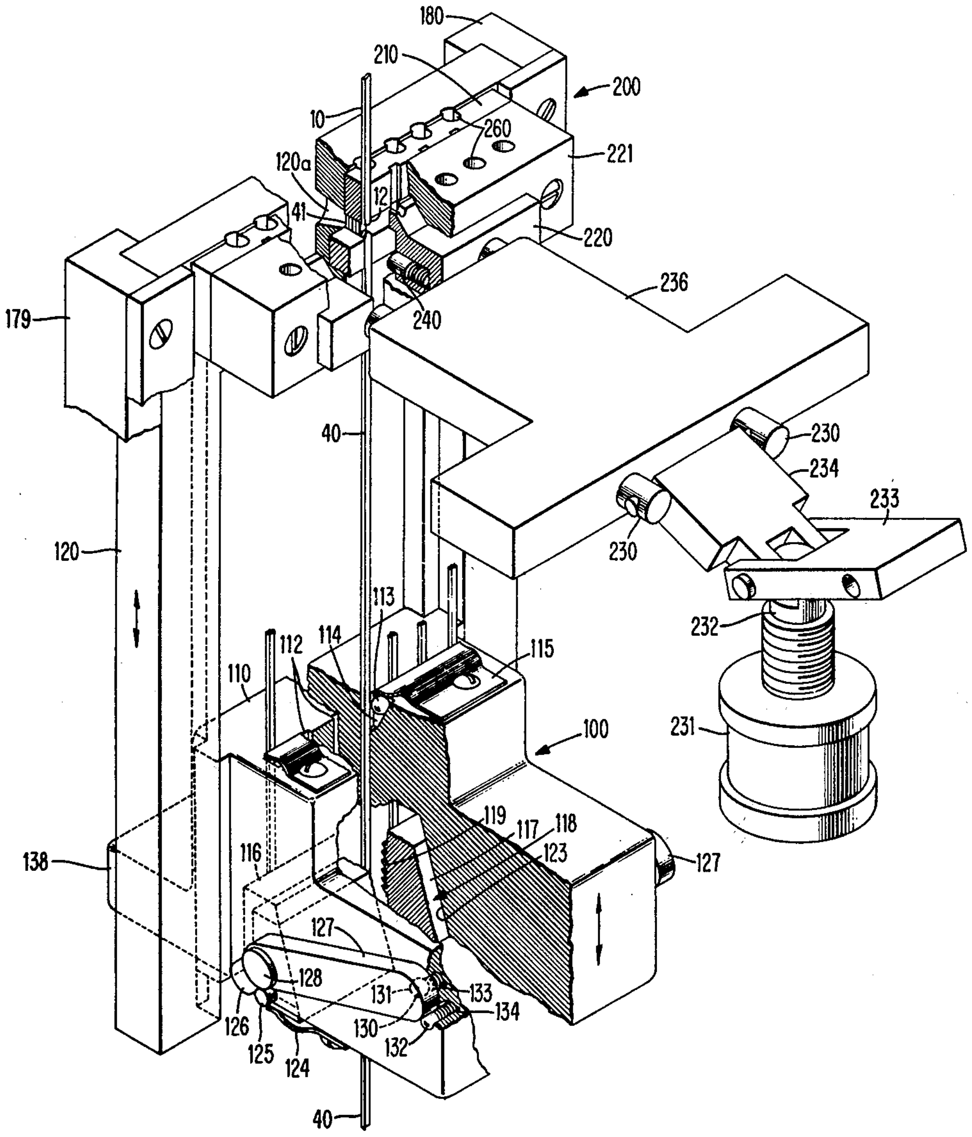
FIG. 11 is an isometric view showing the stock feeding and pulling mechanism and showing, in part, the contact element cutoff mechanism.

The slide 120 carries the stock cutoff mechanism 200, FIGS. 5 and 11, which functions to sever the tail portion 12 of the formed contact elements 10 from the stock 40. As the stock cutoff mechanism 200 operates to sever the tail portion 12 of the contact elements 10 from the stock 40, it also cuts out a clearance piece of stock 41 to prevent interference between the severed contact elements 10 and the stock 40 as the receptacle 20 is advanced to bring another like row of passageways 22 into position for receiving the stock material 40. The cutoff mechanism 200, best seen in FIG. 11, includes a fixed female die element 210 and a slidable male die element 220. The slidable male die element 220 is actuated by rods or plungers 230 operated by a pneumatic cylinder 231. By this arrangement, the cutoff mechanism 200 may be moved in a vertical direction while being acted upon by the plunger 230.

Figure 9:
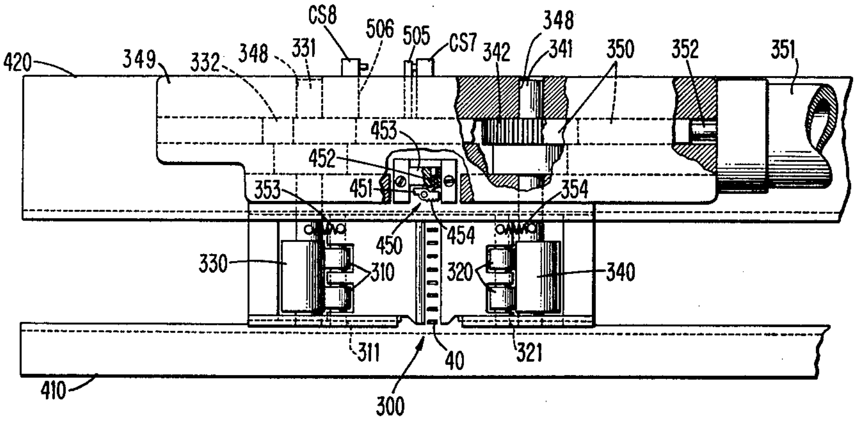
FIG. 9 is a detail plan view of the contact element forming dies and the mechanism for actuating the same.
Figure 10:
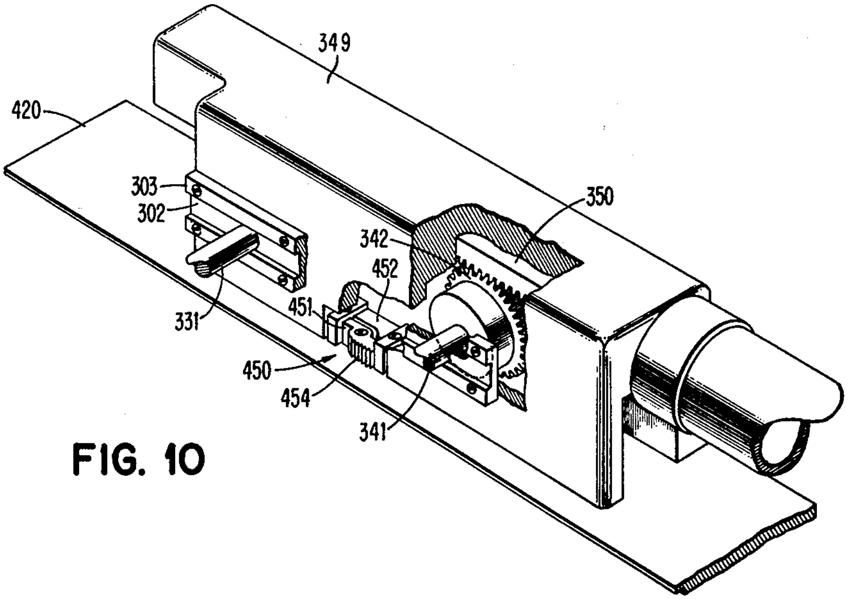
FIG. 10 is a perspective view of the mechanism for actuating the contact element forming dies.

The strips of stock material 40 are fed by the stock feeding and pulling mechanism 100 between contact element forming dies 300, FIGS. 5 and 9. In order to form the contact elements 10, the forming dies 300 are reciprocated toward each other by means of cams 330 and 340. The cams 330 and 340 act upon cam followers 310 and 320 carried by the forming dies 300. The cams 330 and 340 are fixedly mounted on shafts 331 and 341 which also carry gears 332 and 342. The gears 332 and 342 are caused to rotate by means of a rack 350 driven by a pneumatic cylinder 351. As the gears 332 and 342 rotate, the cams 330 and 340 act upon the cam followers 310 and 320 and thereby move the forming dies 300 toward each other to form the contact elements 10.

The receptacles 20, FIG. 2, are grooved along their sides to be received by a pair of spaced apart guide and support rails 410 and 420, FIG. 9, which extend from one work station to the other. The receptacles 20 are advanced along the support rails 410 and 420 in ½-inch increments by a receptacle feeding mechanism 400, FIGS. 1, 7 and 8. The work stations 50 and 60 are spaced from each other to permit the advancement of the receptacles 20 in uniform or the same increments, even though alternate rows of passageways 22 will be successively positioned at the respective work stations. The receptacle advancing mechanism 400 is operated by a pneumatic cylinder 430, FIGS. 7 and 8, and essentially consists of a rectangular, longitudinal rod 432 carrying spaced pivotally mounted feed fingers 433. The feed fingers 433 each have a hook-shaped end 434 which is adapted to mate with a series of spaced V-shaped notches 24 provided in the sides of the receptacles 20. The apexes of the V-shaped notches 24 are located on ½-inch centers. The feed fingers 433 serve to both feed the receptacles 20 in ½-inch increments and to detent the receptacles 20 in position for receiving the stock material 40 which is to be formed into the contact elements 10 by the forming dies 300.

*Stock feeding and pulling mechanism*

The stock feeding and pulling mechanisms 100 at each work station 50 and 60 are identical and each functions to feed the stock 40 upward through the stock cutoff mechanism 200 and the aligned row of passageways 22 and the cavity 30 of the receptacles 20 and therebeyond to permit the forming of the contact elements 10 by the forming dies 300. After the contact elements 10 are formed, they are seated within the receptacles 20 by the stock feeding and pulling mechanism 100.

Figure 13:
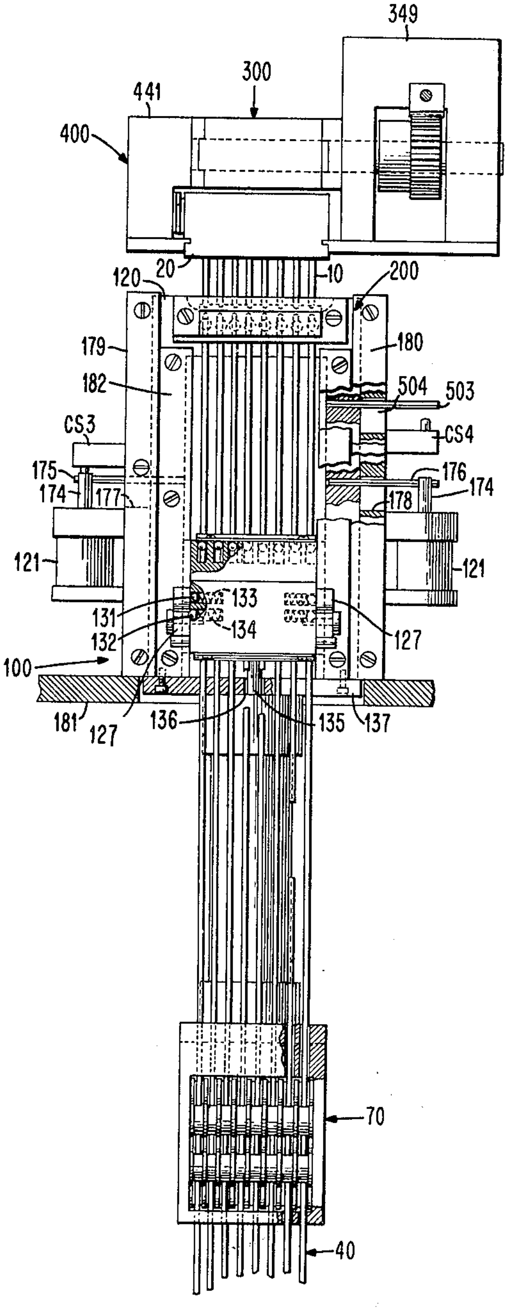
FIG. 13 is an end elevational view of the apparatus for forming and inserting the contact elements of one configuration into the receptacles at one of the work stations.

The stock feeding and pulling mechanism 100, FIGS. 5, 11 and 13, consists of the slide 110 having eight centrally located parallelly spaced passages 112 extending the length thereof to accommodate eight strips of stock material 40. The stock material 40 extends through the eight passages 112 to the stock cutoff mechanism 200. Each of the passages 112 at its upper end is recessed so that an inclined pocket 113 sloping upwardly to the right is formed. The inclined pockets 113 are part of a friction stock feeding device which also includes for each pocket 113 a spherical latch 114 biased into the pocket 113 and against the stock 40 passing through the associated passage 112 by an arched cantilever spring 115 fixed at one end to the slide 110. By this arrangement, as the slide 110 is moved upward, the eight strips of stock 40 also move upward because they are held against relative movement by the latches 114.

The eight strips of stock material 40 are initially threaded through the passages 112 of the stock feeding and pulling mechanism 100 and through the stock cutoff mechanism 200. Upon the initial insertion of the stock material 40, the stock cutoff mechanism 200 may be operated to trim the stock 40. Also, by trimming the stock 40, the trimmed end will be in the proper position so that, when the slide 110 is moved upward during a feeding operation, the stock 40 will be carried upward through the passageways 22 and cavity 30 of the receptacle 20 and between the forming dies 300 the right amount, whereby complete contact elements 10 will be formed by the forming dies 300 without a subsequent trimming operation.

While the latches 114 function to prevent movement of the stock material 40 relative to the slide 110 during a stock feeding operation, another mechanism is utilized for this function during the pulling of the stock 40 for seating the formed contact elements 10.

The lower end of the slide 110 adjacent to the passages 112 is recessed to form a lateral outwardly opening groove 116 with an inclined wall 117 sloping downwardly to the right. A latch bar 118 is disposed within the groove 116 and has a serrated face 119 directed toward the passages 112 and an opposite face 123 inclined to complement the inclined wall 117 of the groove 116. The latch bar 118 is biased into the groove 116 by means of an arched cantilever spring 124 fixed at one end to the slide 110.

Pins 125 fixed to project from each side of the latch bar 118 are adapted to engage cam surfaces 126 formed at one of the ends of latch release levers 127 pivotally mounted on the slide 110 to flank the sides thereof. The latch release levers 127 are provided with holes located intermediate their ends through which pins 128 extend. The pins 128 are pressed fitted into a hole or bore 129 extending the width of the slide 110. The other ends of the latch release levers 127 are provided with circular recesses 130 which are adapted to mate with spaced apart spring-biased ball detents 131 and 132 located in bores 133 and 134 machined into the sides of the slide 110. Each latch release lever 127 holds the ball detents 131 and 132 in their respective bores 133 and 134; however, only one ball of the balls 131 and 132 detents the associated latch release lever 127 in one of the two positions at any one time. With the latch release levers 127 detented by the balls 131, the spring 124 is prevented from urging the latch bar 118 upward and into engagement with the eight strips of stock material 40. When the latch release levers 127 are pivoted into position so that the balls 132 are detenting them, the spring 124 is unopposed by the latch release levers 127 and the latch bar 118 is urged by the spring 124 to engage the strips of stock material 40.

The slide 110 is moved upwardly and downwardly by means of the pneumatic cylinder 111 having a piston rod 135 passing through a clearance hole 136 in a bottom plate 137 of the main slide 120 and fixedly attached to a foot portion 138 of the slide 110. The bottom plate 137 serves to mount the cylinder 111. As it will be seen shortly, the slide 110 may be moved relative to or with the main slide 120. During a stock feeding operation, the slide 110 is moved upward relative to the main slide 120 as the cylinder 111 is operated to extend the piston rod 135. As the slide 110 moves upward, the stock material 40 is also carried upward, the stock 40 being gripped by the spherical latches 114. Also, during the stock feeding operation, the latch release levers 127 are detented in position by the balls 131 to hold the latch bar 118 out of engagement with the stock material 40. However, as the slide 110 reaches the limit of its upward travel, the latch release levers 127 engage pins 139, FIG. 5, disposed to project downward from a sidewardly projecting leg 140 of an angle member 141 fixed to a vertical support element 142. As the latch release levers 127 engage the pins 139, during the upward movement of the slide 110, they are pivoted clockwise into position to be detented by the balls 132. With the latch release levers 127 in this position, the latch bar 118 is urged by the spring 124 to grip the stock material 40. Of course, the forming dies 300 form the contact elements 10 before the piston rod 135 is retracted to move the slide 110 downward. The cylinder 111 is quite adequate for furnishing power to feed the stock material 40; however, it is not relied upon to pull the stock material 40 to seat the contact elements 10 within the receptacle 20.

Since the protuberances 14 of the contact elements 10 bite into the base section of the receptacle 20 so that the contact elements 10 become firmly anchored relative to the receptacle 20, a rather high force is necessary for this operation. Hence, a force additional to the cylinder 111 is provided to move the slide 110 downward. This additional force is derived from the pneumatic cylinder 161, FIG. 5, having a piston rod 162 attached to a rack 164 which meshes or cooperates with a gear 165 of the gearing 163. The gear 165 is fixed to a shaft 166 journaled in support plates 167 and 168 and carrying the cam 160. The cam 160 is disposed to act upon a cam follower 169 journaled on pin 170 pressed into and fixed to extend from one side of the foot 138 of the slide 110 to force the same downward as the shaft 166 is rotated through the gear 165 and rack 164.

With the contact elements 10 fully seated as the slide 110 is forced downward by the cam 160, the stock cutoff mechanism 200 is operated to cut the tail portion 12 of the contact elements 10 from the stock material 40. As it will be seen later herein, the stock cutoff mechanism 200, after the stock 40 is severed from the contact elements 10, remains actuated to maintain a grip on the stock strips 40 to maintain control thereover.

However, in order for the formed and seated contact elements 10 to clear the stock cutoff mechanism 200 as the receptacle 20 is advanced by the receptacle advancing mechanism 400, the stock cutoff mechanism 200 is carried downward by means of the main slide 120 to which it is attached.

The main slide 120 has two principal functions. It serves to move the stock cutoff mechanism 200 clear of the contact elements 10 severed from the stock material 40. It also serves, at the same time, to carry the slide 110 together with its associated cylinder 111 and stock straightener 70 downward to reset the latch release levers 127. The total downward movement of the main slide 120 is approximately ¼ inch. This is sufficient to bring the stock cutoff mechanism 200 clear of the severed contact elements 10 and to move the latch release levers 127 clear of projections 172 of an actuating block 173 fixed to the support element 142. Movement of the main slide 120 causes the latch release levers 127 to be pivoted counterclockwise by the projections 172, whereby the latch release levers 127 act upon the pins 125 to cam the latch bar 118 out of engagement with the stock material 40.

With the latch bar 118 out of engagement with the stock material 40, the cylinder 111 may be operated to retract the piston rod 135 and thereby move the slide 110 to the home position. The main slide 120 may then be moved upward or be returned to its home position.

The main slide 120, as seen in FIGS. 5 and 13, is operated by the pneumatic cylinders 121 having vertically extending piston rods 174 attached to sidewardly projecting rods 175 and 176 fixed to the sides of the main slide 120. The rods 175 and 176 pass through clearance holes 177 and 178, respectively, provided in stationary guide members 179 and 180 for the slide 120. The guide members 179 and 180 are fixed to a stationary base 181 which is slotted to permit the passage of guides 182 for the slide 110 and the bottom plate 137 of the main slide. The clearance holes 177 and 178 are quite adequate to permit ¼-inch motion of the slide 120.

*Stock straightener*

At each work station 50 and 60, there are stock straighteners 70. Each stock straightener 70 is fixed to depend from the lower base of the cylinder 111 and functions to iron out any kinks or bends in the coiled strips of stock material 40. The stock straightener 70 consists of a housing 71 bored and slotted to journal a series of straightening rolls 72 and to provide passages for the stock material 40. The stock material 40 is guided into the lower end of the housing 71 by a bell-shaped slotted opening 73 and passes a first group of parallelly spaced straightening rolls 74 journaled upon a support rod 75 and disposed to have their periphery tangential to the stock feed path at the left hand thereof.

A second group of parallelly spaced straightening rolls 76 is journaled upon a support rod 77 spaced from the rod 75 and to the right thereof so that the periphery of the straightening rolls 76 is tangential to the stock feed path from the right side thereof. Similarly, there is a group of straightening rolls 78 disposed to the left of the stock feed path near the place where the stock material 40 emerges from the housing 71.

Intermediate of the groups of straightening rolls 76 and 78 are disposed two groups of straightening rolls 79 and 80 having their periphery extending through the stock feed path and to the right and left thereof, respectively. By this arrangement, any kinks in the stock 40, regardless of their direction, will be straightened.

*Stock cutoff mechanism*

The stock cutoff mechanism 200 at each work station is identical and is fixed to project from the main slide 120 to the right, FIGS. 5 and 11. The main slide 120 is provided with an outwardly relieved bore 120*a* for receiving the clearance pieces of stock material 41. The stock cutoff mechanism 200 essentially consists of the stationary female die element 210 and the slidable male die element 220. The male and female die elements 220 and 210 are contoured to form or trim the end of the remaining stock material 40 and the ends of the contact elements 10 and leave clearance pieces 41. Also, the male die element 220, which is contoured to complement the female die element 210, includes a series of spaced spring-loaded pins 240 which are disposed to abut the strips of stock material 40 as the male die element 220 is reciprocated to the left during the cutoff operation.

The male die element 220 is reciprocated within a slotted housing 221 secured to the main slide 120 by action of the pneumatic cylinder 231 mounted in an upright position by an L-shaped bracket 250 extending from the vertical support element 142. The cylinder 231 is provided with a piston rod 232 having links 233 and 234 of a toggle linkage connected to its end. The other end of the link 233 is supported upon a pin 235 fixed to extend from the L-shaped bracket 250, while the other end of the link 234 is attached to one end of the rod 230 slidably supported in a bored block 236 fixed to the upper end of the support element 142. The other end of the rod 230 abuts the outer face of the male die element 220.

As the piston rod 232 of the cylinder 231 is extended, the links 233 and 234 are moved with the piston rod 232 to slide the rod 230 to the left. Since the end of the rod 230 is in engagement with the outer face of the male die element 220, the male die element 220 will be reciprocated to the left as the rod 230 is moved to the left by the piston rod 232 through the linkage as the cylinder 231 is operated. Because the pins 240 are spring loaded, they may engage the stock strips 40 in advance of the male die element 220 and permit continued movement of the male die element 220 which then cooperates with the female die element 210 to shear the stock material 40.

After the shearing operation, the main slide 120 is lowered by the cylinders 121; but the cylinder 231 remains operated so that the pins 240 are still urged against the upper end of the remaining stock material 40. As the main slide 120 is lowered, the slide 110, the cylinder 111 and straightening mechanism 70 are also lowered.

Figure 12:
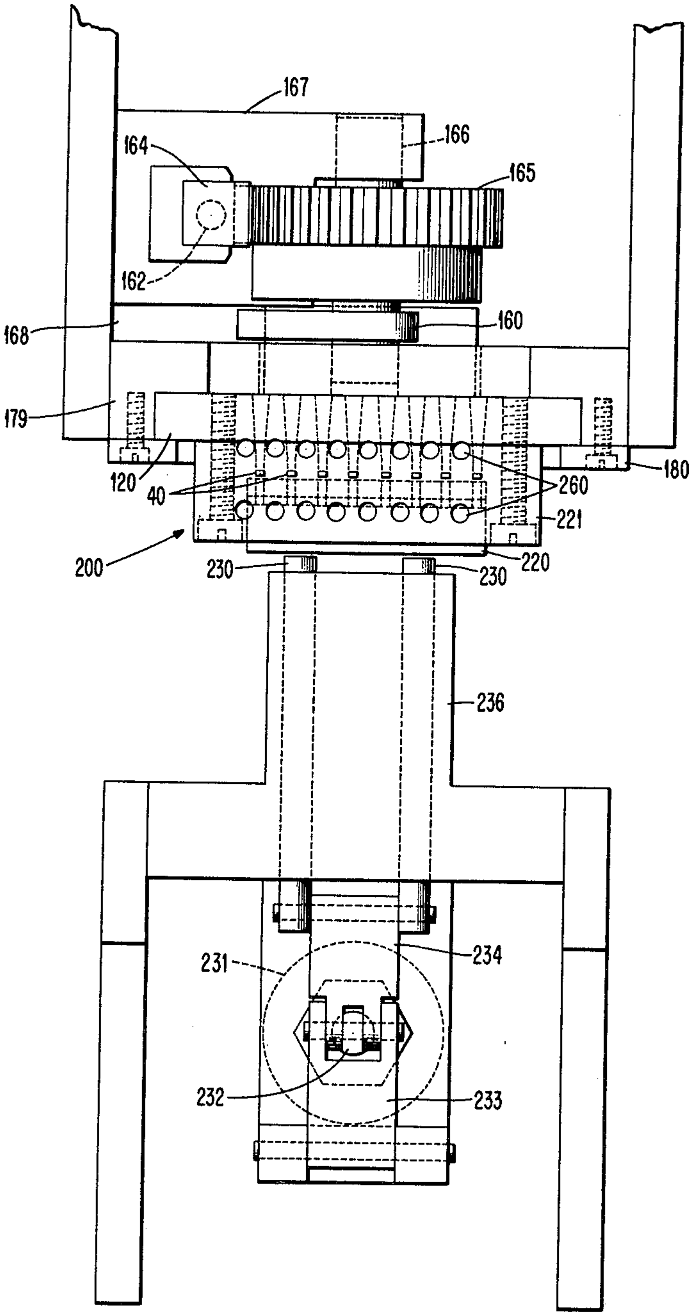
FIG. 12 is a plan view of the mechanism for seating the formed contact elements within the receptacle.

The lowering of the main slide 120 carries the same and the stock cutoff mechanism 200 clear of the previously formed and inserted contact elements 10. In order for the main slide 120 together with the stock cutoff mechanism 200 to be in the fully upward position at the work station 60 without interfering with the contact elements 10 inserted into the receptacle 20 at the work station 50, both the housing 221 of the stock cutoff mechanism 200 and the main slide 120 are bored from the top, as seen in FIGS. 11 and 12, to provide for two rows of holes 260 for receiving the tail portion 12, of two rows of contact elements 10 inserted at work station 50.

*Contact element forming dies*

The contact element forming dies 300 located at the first work station 50 form contact elements 10 from the stock material 40 having the configuration of the contact element 10 shown in FIG. 4, while the forming dies 300, FIG. 6, located at the second work station 60 form contact elements 10 having the configuration of the contact element 10 shown in FIG. 3. While the forming dies 300 at the two work stations 50 and 60 are of different configurations, the mechanism for operating the dies is substantially identical.

The die elements 300 at each work station, FIGS. 5 and 9, are provided with bars or ways 301 fixed to their sides. These bars 301 are adapted to slide within inwardly opening grooves 302 formed within fixed guides 303 which slidably support the forming die elements 300 from each side.

The rear end of the forming die elements 300, FIG. 9, are notched to receive rotatably mounted cam followers 310 and 320 journaled on shafts 311 and 321 extending through the die elements 300. The cam followers 310 and 320 are urged to follow cams 330 and 340 mounted on shafts 331 and 341 journaled in the guides 303 and extending from the guides 303 into bores 348 provided in a stationary housing 349 fixed to the guide rail 420 for mounting and supporting the receptacles 20. The shafts 331 and 341 carry the gears 332 and 342 which mesh with the rack 350 attached to one end of a piston rod 352 of the pneumatic cylinder 351.

Hence, as the cylinder 351 is operated to extend the piston rod 352, the rack 350 is moved to the left, thereby rotating the gears 332 and 342. As the gears 332 and 342 rotate, the shafts 331 and 341 to which they are fixed are also rotated. Thus, the cams 330 and 340, which are also fixed to the shafts 331 and 341, are rotated. Rotation of the cams 330 and 340 causes the forming die elements 300 to be moved toward each other as the cam followers 310 and 320 follow the cam surfaces of the cams 330 and 340. The cam followers 310 and 320 are urged to follow the cams 330 and 340 by means of springs 353 and 354 having one end fixed to the die elements 300 and the other end fixed to the shafts 331 and 341, respectively. As the shafts 331 and 341 rotate, the springs 353 and 354 partially wrap the shafts, the rotation of the shafts being limited to 180°. When the cylinder 351 is operated to retract the piston rod 352, the forming die elements 300 are moved away from each other as the springs 353 and 354 urge the cam followers 310 and 320 to follow the cams 330 and 340.

*Receptacle advancing mechanism*

Figure 7:
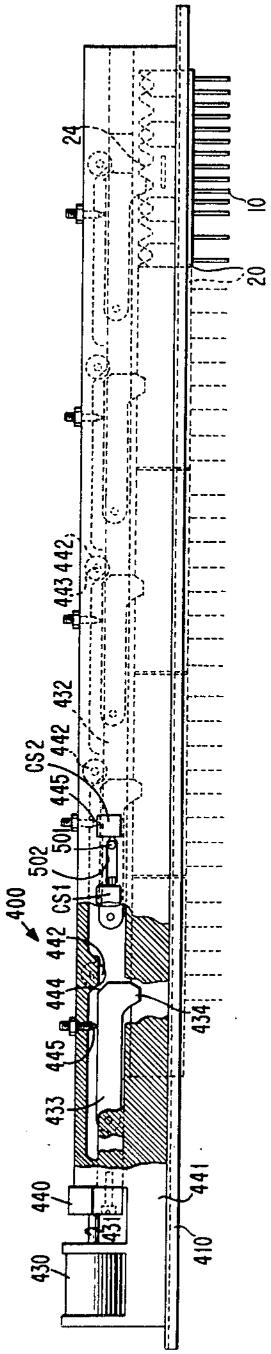
FIG. 7 is a detail view of the receptacle advancing mechanism schematically shown in FIG. 1, the receptacle advancing mechanism is shown with the feed fingers detenting the receptacles in position.
Figure 8:
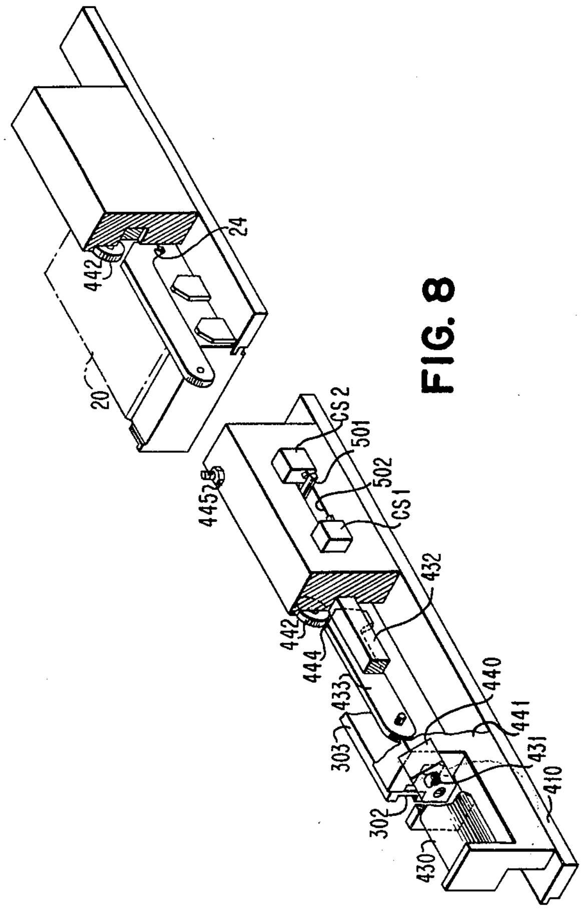
FIG. 8 is a perspective view of the receptacle advancing mechanism with sections broken away to expose the various elements of the mechanism.

The receptacle advancing mechanism 400, FIGS. 1, 7 and 8, advances the receptacles 20 along guide and support rails 410 and 420 to successively position rows of passageways 22 to receive the stock material 40 at the two work stations 50 and 60. The two rows of passageways 22 associated with each cavity 30 are on ¼-inch centers; hence, in order to present alternate rows of passageways 22 in position to receive the stock material 40, the receptacle advancing mechanism 400 advances the receptacles 20 in ½-inch increments. The work stations 50 and 60 are spaced from each other to permit the advancement of the receptacles in uniform increments so that successive alternate rows of passageways 22 will be presented in position at the work stations 50 and 60.

The receptacles 20, supported by the guide rails 410 and 420, are provided with spaced V-shaped notches 24 which are adapted to receive the hooked ends 434 of the spaced feed fingers 433 pivotally mounted on the longitudinal, rectangular rod 432. One end of the rod 432 is fastened to a pentagon-shaped mounting bracket 440, three sides being of one dimension while the other two sides being of a different dimension.

The mounting bracket 440 is bored to receive one end of a piston rod 431 of the pneumatic cylinder 430. The cylinder 430 is fixed to one end of a longitudinal support member 441 which attaches to the guide rail 410. The support member 441 is grooved to guide the rectangular rod 432 and is channeled to accommodate the feed fingers 433 and a series of spaced camming detent rolls 442 which act upon the feed fingers 433 to hold them down into the V-shaped notches 24 at the end of the feed stroke and thereby detent the receptacles 20 in position. The detent rolls 442 are mounted upon pins 443 which are pressed into holes provided in the support member 441. The feed fingers 433 have a beveled surface 444 which is adapted to engage the detent rolls 442. As the feed fingers 433 engage the detent rolls 442, they are held down into the V-shaped notches 24 provided in the sides of the receptacles 20. In this manner, the receptacles 20 are precisely located and held against movement at the work stations.

The feed fingers 433 are merely pivotally mounted to the rod 432. However, they are prevented, during the feeding operation, from jumping or bouncing out of the V-shaped notches 24 by means of spring-loaded plungers 445 depending from and attached to the channeled support member 441. The degree that the plungers 445 depend from the support member 441 is adjustable to provide the best control.

By the arrangement just described, when the cylinder 430 is operated to advance the piston rod 431, the feed fingers 433 residing in the V-shaped notches 24 are carried to the right and thereby advance the receptacles 20. Subsequently, the cylinder 430 is operated to retract the piston rod 431. However, the rod 432 carrying the feed fingers 433 moves to the left as the piston rod 431 retracts; and, during this movement, the feed fingers 433 ride out of the V-shaped notches 24.

In order to enable the feed fingers 433 to ride out of the V-shaped notches 24 without moving the receptacles 20, a series of spaced detent mechanisms 450, FIG. 9, are provided. These detent mechanisms 450 are mounted on the support rail 420, and the housing 349 is notched to accommodate the detent mechanisms 450. The detent mechanisms each essentially consist of a pivotally mounted serrated latch 451 biased by a compression spring 452 contained in a bore of a block 453 fixed to the support rail 420. The serrations 454 of the latch 451 engage the one side of the receptacles 20 as the latch 451 is urged by the spring 452. The serrations 454 are so formed to permit movement of the receptacles 20 to the right but hold the receptacles 20 against movement to the left.

*Control circuitry*

The mechanism for forming and inserting the formed contact elements into the receptacles and for successively indexing the receptacles, as described above, operates in a particular sequence. By first understanding this sequence, the control circuitry will be more easily understood.

The first event to take place is the positioning of the receptacles 20. The receptacles 20 may be supplied in any convenient manner, such as from a vibratory feed hopper. The receptacles may then be guided so that one of the receptacles 20 is supported by the guide rails 410 and 420 and is positioned at the first work station 50 by the first feed finger 433 to bring the first cavity 30, in the direction of travel of the receptacle, into position for the formation and insertion of contact elements 10 into the second row of passages 22 associated with the first cavity 30.

As the cylinder 430, FIG. 8, is operated to extend and retract the rod 432 carrying the feed fingers 433, contact switches CS1 and CS2 are operated. The switches CS1 and CS2 are operated by a pin 501 fixed to extend from the side of the rod 432 and through a slot 502 formed in the support member 441. With the rod 432 retracted, the contacts of the switch CS1 are open, the contacts are normally closed, and the contacts of the switch CS2 are open.

With the receptacle 20 positioned by the feed finger 433 upon advancement of the rod 432, the cylinder 121 for advancing the main slide 120, FIGS. 5 and 13, is operated to bring the slide 120 into the extended upward position.

As the slide 120 moves up and down, FIG. 13, contact switches CS3 and CS4 are operated. The switch CS3 is attached to the guide member 179 in a position to be actuated by the end of the piston rod 174 when the same is fully extended. The switch CS4 is fixed to extend from the guide member 180 in a position to be actuated by an arm 503 fixed to the slide 120 to extend through a slot 504 in the guide member 180. With the slide 120 in the upward position, the contacts of the switch CS3 are closed and the contacts of the switch CS4, which consist of normally open and closed contacts, are transferred so that the normally closed contact is closed.

After the slide 120 is in the upward position, the stock material 40 may be fed through the aligned row of passageways 22 to enter between the forming dies 300. To accomplish this, the cylinder 111 is operated to extend the slide 110 fully upward. The slide 110, itself, actuates contact switches CS5 and CS6, FIG. 5. The switch CS5 is fixed to the base 181 so as to be actuated by the slide 110 when the same is in the downward or retracted position. With slide 110 in the downward position, the contacts of the switch CS5 are open, because the contacts of switch CS5 are normally closed. The switch CS6 is fixed to the leg 140 of the angle member 141 in a position so as to be actuated by the slide 110 when the same is in the upward position. With the slide 110 in the upward position, the contacts of the switch CS6 are closed.

The stock 40 having been fed between the forming dies 300, the cylinder 351 is operated to extend the rack 350 and thereby move the dies 300 toward each other to form the contact elements 10. After the contact elements 10 are formed, the cylinder 351 is operated to retract the rack 350 to open the dies 300.

As the cylinder 351 is operated to extend and retract the rack 350, FIG. 9, switches CS7 and CS8 are operated. The switches CS7 and CS8 are fixed to the housing 352 to be operated by a pin 505 fixed to extend from the rack 350 through a slot 506 formed in the outer facing side of the housing 352.

With the dies 300 in the open position or the rack 350 retracted, the contacts of the switch CS7 are closed and the contacts of the switch CS8 are open.

After the forming dies 300 are returned to their open position, the formed contact elements are seated. This is accomplished by operating the cylinder 111 in a manner to retract the slide 110 and by operating the cylinder 161 to retract the extended piston rod 162 and thereby rotate the cam 160 through the gearing 163. As the cam 160 rotates, it acts upon the cam follower 169 to move the slide 110 downward to seat the formed contact elements 10. During this operation, the slide 110 moves approximately one-half of the way down and then stops with the tail of the latch release levers 127 in engagement with the projections 172.

Upon the piston rod 162 reaching its fully retracted position, the contacts of a switch CS9 are closed, FIG. 5. The switch CS9 is fixed to be actuated by a lever 507 attached to extend from the rod 162. While the cylinder 161 is operated to fully retract the piston rod 162, the cylinder 111 is operated to retract the slide 110 only halfway. Hence, the contacts of the switch CS6 open as the slide 110 starts downward; however, because the slide 110 travels only halfway, the contacts of the switch CS5 still remain closed.

The next event to take place is the shearing of the tail portion 12 of the formed contact elements 10 from the stock material 40. To shear the contact elements 10 from the stock 40, the cylinder 231 is operated to extend the associated piston rod 232 upward. As the piston rod 232 extends upward, the rod 230 slides to the left, carrying the male die element 220 against the stock 40 to shear the same in cooperation with the female die element 210. Of course, during this operation, the spring-loaded pins 240 engage the strips of stock 40 to hold the same against movement relative to the stock cutoff mechanism 200. A lever 508, attached to extend from the piston rod 232, opens the normally closed contacts of a contact switch CS10 when the piston rod 232 is fully extended.

With the contact elements 10 severed from the strips of stock 40, the main slide 120 may be lowered to bring the stock cutoff mechanism 200 clear of the contact elements 10 so that the receptacles 20 may be advanced by the receptacle advancing means 400.

The main slide 120 is lowered by operating the cylinders 121 to retract the piston rods 174. Because the stock 40 must not be pulled out of position relative to the stock cutoff mechanism 200 during this time, the cylinder 231 remains operated to hold the piston rod 232 extended. As the slide 121 moves downwardly, the latch release levers 127 are pivoted counterclockwise by the projections 172. In so doing, the latch release levers 127 act upon the pins 125 to cam the latch bar 118 out of engagement with the stock material 40. Further, upon the downward movement of the slide 120, the contacts of the switch CS3 open; and, when the slide 120 is fully retracted, the contacts of the contact switch CS4 transfer so that the normally open contacts are closed.

With the latch bar 118 out of engagement with the stock material 40, the cylinder 111 is operated to retract the slide 110 to its fully retracted position. When the slide 110 is fully retracted, the normally closed contacts of the contact switch CS5 are opened. Since the slide 110 is now retracted, the cylinder 231 may be operated to retract the piston rod 232 to permit a subsequent feeding operation of the stock material 40. Of course, when the piston rod 232 retracts, the contacts of the contact switch CS10 close. This completes a cycle of operation, and another or like cycle of operation may be repeated by operating the cylinder 430 to retract the rod 432 and thereby retract the feed finger 433 which will then drop into the second V-shaped notch 24 so that, upon operating the cylinder 430 to advance the rod 432, the receptacle 20 will be advanced by the feed finger 433 to bring the second row of passageways 22 of the succeeding cavity 30 into position for receiving the stock material 40.

With the sequence of operation of the contact element forming and inserting apparatus having been described, the elements forming the control circuitry will be described. The control circuitry which will be described is typical of circuitry for controlling the operation of the apparatus located at each work station. The circuitry is shown as being independently operated, whereas controls could be added whereby the mechanisms at the work stations would be operating simultaneously or only the mechanism at one work station would be operating. Until a receptacle arrives at work station 60, only the mechanism at station 50 will be operating. When there are receptacles at both work stations, then the mechanisms thereat operate simultaneously. Likewise, during receptacle runout from work station 50, only the mechanism at work station 60 will be operating. The elements of the control circuitry are shown in their normal or unoperated position. One of the normally open contacts of the contact switch CS2 is connected by a conductor 601 to a normally closed contact R6*b* of a relay R6. The associated normally open contact R6*b* is connected by continuation of the conductor 601 to one terminal of a solenoid S6 having its other terminal returned to one side of the A.C. potential. The other contact of the switch CS2 is connected by a conductor 602 to a normally open contact R1*c* of a relay R1. The conductor 602 continues and connects the contact R1*c* to one terminal of a solenoid S1 having its other terminal returned to the one side of the A.C. supply. The transfer contact associated with the normally open and closed contacts R6*b* is connected to the other side of the A.C. potential by a conductor 603 commonly connecting a transfer contact associated with normally open and closed contacts R2*b* and normally open contacts R3*b* and R4*b* of relays R2, R3 and R4, respectively.

The normally open contact R2*b* is connected to one terminal of a solenoid S2 having its other terminal returned to the one side of the A.C. supply. The normally closed contact R2*b* is connected to a transfer contact associated with normally open and closed contacts R5*b* of a relay R5 and a normally closed contact R7*c* of a relay R7. The normally closed contacts R5*b* and R7*c* are connected in parallel to one terminal of a solenoid S7 which has its other terminal returned to the one side of the A.C. supply. The normally open contact R5*b* is connected to one terminal of a solenoid S5 having its other terminal returned to the one side of the A.C. supply. The normally open contact R3*b* is connected to one terminal of a solenoid S3, while the normally open contact R4*b* is connected to one terminal of a solenoid S4; the other terminals of solenoids S3 and S4 are returned to the one side of the A.C. supply.

The cylinder 351 for extending and retracting the rack 350, which, in turn, through the gears 332 and 342 actuates the forming dies 300, is controlled by the solenoid S3. When the solenoid S3 is energized, air is admitted to the cylinder 351 to extend the rack 350 and thereby move the forming dies 300 toward each other and close the same to form the contact elements 10. On the other hand, when the solenoid S3 is de-energized, air is admitted to the cylinder 351 to retract the rack 350 and thereby open the forming dies 300.

The solenoid S4 controls the admission of air to the cylinder 161 which extends and retracts the rack 164 for rotating the gear 165 to rotate the cam 160. As the cam 160 rotates, it acts upon the cam follower 169 to carry the slide 110 downward to seat the formed contact elements 10. When the solenoid S4 is energized, air is admitted to the cylinder 161 to retract the rack 164 and thereby cause the seating of the formed contact elements 10. Upon de-energization of the solenoid S4, air is admitted to the cylinder 161 to cause the rack 164 to extend. Of course, the solenoid S4 cannot be de-energized until the slide 110 is ready to be retracted the rest of the way to the downward position.

The solenoid S1 operates a valve for admitting air to the cylinder 121. When the solenoid S1 is energized, air is admitted to the cylinder 121 to move the main slide 120 upward; and, when the solenoid S1 is de-energized, air is admitted to the cylinder 121 to retract the slide 120 or move it to its downward position. Operation of the cylinder 111 which causes movement of the slide 110 is controlled by the solenoids S2 and S7; the solenoid S2 is for controlling the upward movement of the slide 110 while the solenoid S7 controls the downward movement thereof.

The cylinder 430 which functions to advance and retract the rod 432 during the operation for advancing the receptacles 20 is controlled by the solenoid S6. When the solenoid S6 is energized, air is admitted to the cylinder 430 to retract the rod 432 and maintain the same retracted; and, when the solenoid S6 is de-energized, air is admitted to extend the rod 432 and maintain the same extended.

The solenoid S5 controls the admission of air to the cylinder 231 which, in effect, operates the stock cutoff mechanism 200. When the solenoid S5 is energized, air is admitted to the cylinder 231 so that the same is caused to extend that associated piston rod 232 and thereby reciprocate the male die element 220 into cooperative relationship with the female die element 210 to shear the formed contact elements 10 from the strip stock 40. When the solenoid S5 is de-energized, air is admitted to the cylinder 231 to retract the piston rod 232.

It is seen that the energization of the solenoids S1 to S7, inclusive, is under control of the contact switch CS2 and contacts of relays R1 to R7, inclusive. The relays R1 to R7 are under control of their own contacts and the other contact switches CS1 and CS3 to CS10, inclusive.

The transfer contact of the contact CS4 is connected to a conductor 604 which leads to ground through a line switch LS. The normally closed contact of the switch CS4 is connected to a normally open contact R7*b* of the relay R7. The normally open contact R7*b* connects to one terminal of the relay R7 and to the normally open contact of the switch CS8. The other terminal of the relay R7 is connected to +40 volt D.C. supply, while the normally open contact of switch CS8 connects to the conductor 604.

The normally open contact CS4 connects to a normally closed contact R1*a* of the relay R1 and to a normally open contact of switch CS1. The normally closed contact R1*a* connects to a normally closed contact R5*a* of relay R5 and to a normally open contact R6*a* of relay R6. The normally closed contact R5*a* connects to one terminal of the relay R6; the other terminal thereof is connected to the +40 volt D.C. supply. The normally open contact R6*a* is connected to the normally open contact of the switch CS1.

The relay R1 is connected between ground potential and the +40 volt supply through a normally open contact R6*b* of the relay R6. The normally open contact R6*b* is also connected to a normally open contact R1*b* of relay R1. The normally open contact R1*b* is connected to the normally closed contact of the switch CS10, the same being connected to the conductor 604.

The normally closed contact CS10 is also connected to the normally open contact of the switch CS3. The normally open contact of switch CS3 is connected to a normally closed contact R4*a* of relay R4 connected in series with normally closed contact R5*a* of relay R5 connected to one terminal of the relay R2, the same having its other terminal connected to the +40 volt supply.

The normally open contact of switch CS6 is connected between the conductor 604 and one terminal of the relay R3. The other terminal of the relay R3 is connected to the +40 volt supply through a normally closed contact of normally open and closed contacts R7*a* of the relay R7. The normally open contact R7*a* is connected to one terminal of the relay R4 which has its other terminal connected to the conductor 604 through the switches CS7. The relay R5 is connected between the +40 volt supply and ground potential by one path through the normally open contacts of switch CS9 and by another path through the normally closed contacts of switch CS5 connected in series with the normally open contacts R5*a* of the relay R5.

By the arrangement of the above circuitry, the apparatus for forming and inserting the contact elements 10 into the receptacles 20 positioned at the work stations 50 and 60 and the mechanism for positioning the receptacles will be operated according to the sequence previously described.

*Mode of operation*

Assume that the stock material 40 has been threaded at each work station through the stock straighteners 70, through the stock feeding and pulling mechanisms 100, and through the stock cutoff mechanisms 200, and that a receptacle 20 is positioned on support rails 410 and 420 at the first work station 50 and detented into position by the first feed finger 433; the rod 432 being extended by the cylinder 430. Under these assumed conditions, the line switch LS at work station 50 only is closed. The conditions of the contact switches are that the contacts of switches CS1, CS2, CS3, CS5, CS6 and CS8 are open; the normally open contacts of switches CS4 and CS7 are closed; and the normally closed contact of switch CS10 is closed. Relay R1 is energized; all other relays are de-energized. Relay R6, which had been energized, became de-energized upon relay R1 becoming energized because the normally closed contact R1*a* opens upon relay R1 becoming energized. Hence, the circuit for energizing relay R6 is interrupted. Relay R1 remains energized through its now closed normally open contact R1*b* and the normally closed contact of the switch CS10. All solenoids, except solenoid S7, are de-energized. The solenoid S7 is energized through normally closed contacts R5*b* and R2*b*. These conditions are represented on the timing diagram of FIG. 16.

With the relay R1 energized, the normally open contact R1*c* is closed and, thus, the solenoid S1 becomes energized. Energization of the solenoid S1 causes the main slide 120 to move upward and thereby close the normally open contacts of switch CS3. Upon closure of these contacts, the relay R2 becomes energized. This causes the closing of the normally open contact R2*b* and the opening of the normally closed contact R2*b*. Hence, the solenoid S2 becomes energized and the solenoid S7 becomes de-energized. This action causes the cylinder 121 to be operated so as to move the slide 110 upward and thereby feed the strips of stock material 40 between the forming dies 300.

When the slides 110 reach their upward position, they close the contacts of the switch CS6. This causes the relay R3 to become energized. Energization of the relay R3 causes the closure of the normally open contact R3*b* and thereby the solenoid S3 becomes energized.

Upon energization of the solenoid S3, the cylinder 351 is operated to close the contact element forming dies 300 to form the contact elements 10. As the rack 350 starts to extend, the contacts of the switch CS7 open and, when the rack 350 is fully extended to close the dies 300, the contacts of switch CS8 are closed. The opening of the contacts of switch CS7 has no effect because the normally open contact R7*a* is open at the time. However, closure of the contacts of switch CS8 causes the relay R7 to become energized. Energization of the relay R7 causes the relay R3 to becomes de-energized by opening the normally closed contact R7*a*. De-energization of the relay R3 causes the opening of contacts R3*b* whereby the solenoid S3 becomes de-energized and the forming dies 300 open.

Upon the forming dies 300 opening, the contacts of the switch CS8 are opened. This would normally cause the ralay R7 to become de-energized. However, the relay R7 remains energized through the closed normally open contact R7*b* and the closed normally closed contacts of switch CS4. With the relay R7 still energized, the normally open contact R7*a* is still closed. Hence, when the forming dies 300 reach their fully open position, the contacts of the switch CS7 close, whereby the relay R4 becomes energized. Energization of the relay R4 causes the closure of the normally open contacts R4*b*. Upon the closing of the normally open contacts R4*b*, the solenoid S4 becomes energized. Energization of the solenoid S4 causes the cylinder 161 to operate so as to retract the rack 164 and thereby rotate the cam 160 to seat the formed contact elements 10, as the cam 160 forces the slide 110 downward. The downward movement of the slide 110 to seat the formed contact elements is not resisted by the cylinder 111 because the same will be operated because the solenoid S7 is energized when the relay R4 becomes energized. The relay R4 causes the de-energization of relay R2 by opening the normally closed contact R4*a*. Of course, when the relay R2 becomes de-energized, the solenoid S7 can become energized through the closed normally closed contacts R2*b* and R5*b*.

When the cylinder 161 is operated to retract the rack 164, the rack 164, upon reaching its fully retracted position, causes the closure of the normally open contacts of the switch CS9. This causes the relay R5 to become energized. At this time, the relays R4 and R7 still remain energized. Relay R1 has been energized through the entire period described and is still energized. Hence, the rack 164 remains retracted. However, the slide 110 will not be operated in either direction because both the solenoids S2 and S7 are de-energized at this time. The solenoid S2 had already been de-energized, and the solenoid S7 becomes de-energized upon energization of the relay R5 which causes the opening of normally closed contact R5*b* and the closure of the normally open contact R5*b*. Closure of the normally open contact R5*b* also causes the solenoid S5 to become energized.

Energization of the solenoid S5 causes the cylinder 231 to operate so as to extend the piston rod 232 and thereby reciprocate the male die 220 towards the female die 210 to shear the formed contact elements 10 from the stock 40. This also causes the normally closed contacts of the switch CS10 to open, whereby the relay R1 becomes de-energized. De-energization of the relay R1 causes the solenoid S1 to become de-energized. However, the solenoid S5 remains energized, and the stock material 40 is held by the pins 240 which were carried forward with the male die element 220 to engage the stock material 40.

With the solenoid S1 de-energized, the cylinder 121 is operated to cause the lowering of the main slide 120. The lowering of the main slide 120 clears the stock cutoff mechanism 200 of the formed contact elements, and causes the latch release levers 127 to be pivoted by the projections 172. As the latch release levers 127 are pivoted, they act upon the pins 125 to cam the latch bar 118 out of engagement with the stock material 40.

Furthermore, as the slide lowers, the contacts of switch CS3 open; and, when the slide 120 reaches the fully downward position, the normally open contacts of switch CS4 are closed. This causes the relay R7 to become de-energized because the circuit path for holding the same energized includes the normally closed contacts of switch CS4, which are now opened.

De-energization of the relay R7 permits the normally closed contact R7*c*, which had been opened, to close. Hence, the solenoid S7 becomes energized through the normally closed contacts R7*c* and R2*b*. With the solenoid S7 energized, the cylinder 111 is operated to retract the slide 110 to its fully downward position. As the slide 110 reaches the fully downward position, the normally closed contacts of switch CS5 are opened.

The relay R4 became de-energized upon the relay R7 having become de-energized. Upon de-energization of the relay R4, the closed normally open contact R4*b* opens, whereby the solenoid S4 de-energizes. This causes the cylinder 161 to operate so as to extend the rack 164 and return the cam 160 to its home or restored position.

With the rack 164 extended, the contacts of the switch CS9 open. Hence, the relay R5 becomes de-energized because both the make and hold circuitry for the relay R5 is interrupted. The contacts of the switch CS5 are opened upon the return of the slide 110 to its fully downward position.

As the relay R5 becomes de-energized, the closed normally open contact R5*b* opens and the solenoid thus becomes de-energized and the cylinder 231 is operated to permit the return of the male die element 220. By this action, the contacts of the switch CS10 close and thereby condition the hold circuit for the relay R1.

Further, as the relay R5 becomes de-energized, the normally closed contacts R5*a* close and, thus, relay R6 becomes energized. Hence, solenoid S6 becomes energized. This causes the cylinder 430 to be operated to retract the associated piston rod 431 and thereby withdraw the feed finger 433 to a position whereby the same drops into the second in line V-shaped notch 24 of the receptacle 20. During this operation, the detent mechanism 450 holds the receptacle 20 against movement to permit the feed finger 433 to be withdrawn from the first in line V-shaped notch 24. Upon retraction of the piston rod 431, the contacts of switch CS2 open; and, when the rod 431 is fully retracted, the contacts of switch CS1 are opened because the contacts are normally closed contacts. Also, with relay R6 energized, relay R1 becomes energized. However, relay R6 becomes de-energized upon the opening of the contacts of the switch CS1. With the relay R6 de-energized, the solenoid S6 becomes de-energized. Hence, the cylinder 430 is operated to extend the rod 431, thereby carrying the feed finger 433 forward to advance the receptacle 20. The feed finger 433 stays forward to detent the receptacle 20 in position. Of course, as the cylinder rod 431 starts forward, the normally closed contacts of the switch CS1 are permitted to close and, when the rod 431 is fully forward, the normally open contacts of the switch CS2 are closed. Hence, solenoid S1 becomes energized again upon the closing of the contacts of switch CS2 because the energized relay R1 has already caused the closure of normally open contact R1*c*. This completes a cycle of operation and subsequent cycles of operation would take place in a similar or like manner.

While the invention has been particularly shown and described with reference to preferred embodiments thereof, it will be understood by those skilled in the art that various changes in form and details may be made therein without departing from the spirit and scope of the invention.

What is claimed is:

1. A method for forming contact elements from strips of stock and inserting the formed contact elements into a receptacle which comprises:

inserting strips of stock into a plurality of aligned passageways and into and beyond a plurality of cavities of said receptacle, said cavities communicating with said passageways and opening opposite to the direction of insertion;

forming contact elements from the portions of said strips of stock extending beyond said cavities, said contact elements being formed with first portions adapted to reside within said cavities, second portions to reside within said passageways and third portions to extend from said receptacle, said second portions being formed to have an interfering fit with said passageways and said third portions being contiguous and integral with said strips of stock;

pulling said strips of stock relative to said passageways and away from said cavities to cause said second portions to anchor said formed contact elements within said receptacle; and severing said third portions of said formed and inserted contact elements from said strips of stock.

2. A method for forming contact elements from strips of stock and inserting the formed contact elements into a receptacle which comprises:

positioning said receptacle at a first work station so that one row of passageways of said receptacle is aligned in a predetermined position;

inserting strips of stock into said aligned one row of passageways and into and beyond a first plurality of cavities of said receptacle, said first plurality of cavities communicating with said one row of passageways and opening opposite to the direction of insertion;

forming contact elements of a first configuration from the portions of said strips of stock extending beyond said first plurality of cavities, said contact elements of said first configuration being formed with first portions adapted to reside within said first plurality of cavities, second portions to reside within said one row of passageways and third portions to extend from said receptacle, said second portions being formed to have an interfering fit with said one row of passageways and said third portions being contiguous and integral with said strips of stock;

pulling said strips of stock relative to said one row of passageways and away from said first plurality of cavities to cause said second portions to anchor said formed contact elements within said receptacle;

severing said third portions of said formed and inserted contact elements of said first configuration from said strips of stock;

indexing said receptacle to a second work station so that an alternate row of passageways is aligned in a predetermined position thereat;

inserting strips of stock into said aligned alternate row of passageways and into and beyond a second plurality of cavities of said receptacle, said second plurality of cavities communicating with said alternate row of passageways and opening opposite to the direction of insertion;

forming contact elements of a second configuration from the portions of said strips of stock extending beyond said second plurality of cavities, said contact elements of said second configuration being formed with first portions adapted to reside within said second plurality of cavities, second portions to reside within said alternate row of passageways and third portions to extend from said receptacle, said second portions being formed to have an interfering fit with said alternate row of passageways and said third portions being contiguous and integral with said strips of stock;

pulling said strips of stock relative to said alternate row of passageways and away from said second plurality of cavities to cause said second portions to anchor said formed contact elements within said receptacle; and severing said third portions of said formed and inserted contact elements of said second configuration from said strips of stock.

3. A method for forming contact elements from strips of stock and inserting the formed contact elements into a receptacle which comprises:

inserting strips of stock into a plurality of aligned passageways and into and beyond a plurality of cavities of said receptacle, said cavities communicating with said passageways and opening opposite to the direction of insertion;

forming contact elements from the portions of said strips of stock extending beyond said cavities, said contact elements being formed with first portions adapted to reside within said cavities, second portions to reside within said passageways and third portions to extend from said receptacle, said second portions being formed with protuberances whereby one cross-sectional dimension of said second portions is greater than one cross-sectional dimension of said passageways and said third portions being contiguous and integral with said strips of stock;

pulling said strips of stock relative to said passageways and away from said cavities to cause said protuberances to bite into the receptacle body and thus anchor said formed contact elements within said receptacle; and, severing said third portions of said formed and inserted contact elements from said strips of stock.

4. A method for forming contact elements from strips of stock and inserting the formed contact elements into a receptacle which comprises:

inserting strips of stock into a plurality of aligned passageways and into and beyond a plurality of cavities of said receptacle, said cavities communicating with said passageways and opening opposite to the direction of insertion;

forming contact elements from the portions of said strips of stock extending beyond said cavities with anchoring portions being configured by said forming so as to be prevented from passing through said passageways;

pulling said strips of stock in a direction opposite to the direction of insertion whereby said anchoring portions bite into the receptacle body surrounding said passageways and thus anchor said formed contact elements within said receptacle; and severing said formed and inserted contact elements from said strips of stock.

References Cited by the Examiner

UNITED STATES PATENTS

| | | | |
|---|---|---|---|
| 471,625 | 3/92 | Smith | 287—107 |
| 2,036,787 | 4/36 | Zabriskie | 29—417 |
| 2,411,861 | 12/46 | Antony et al. | 339—217 |
| 2,537,820 | 1/51 | Flood. | |
| 2,845,693 | 8/58 | Shetterly et al. | 29—417 X |
| 2,955,352 | 10/60 | Wintriss | 29—155.55 |
| 2,958,926 | 11/60 | Morison | 29—155.5 |
| 3,004,565 | 10/61 | Hanson | 140—71 |
| 3,008,113 | 11/61 | Johnson. | |

JOHN F. CAMPBELL, *Primary Examiner.*